Sept. 21, 1937.   C. H. GORMLEY   2,093,637
RAKE CLEANING ATTACHMENT
Filed June 12, 1936
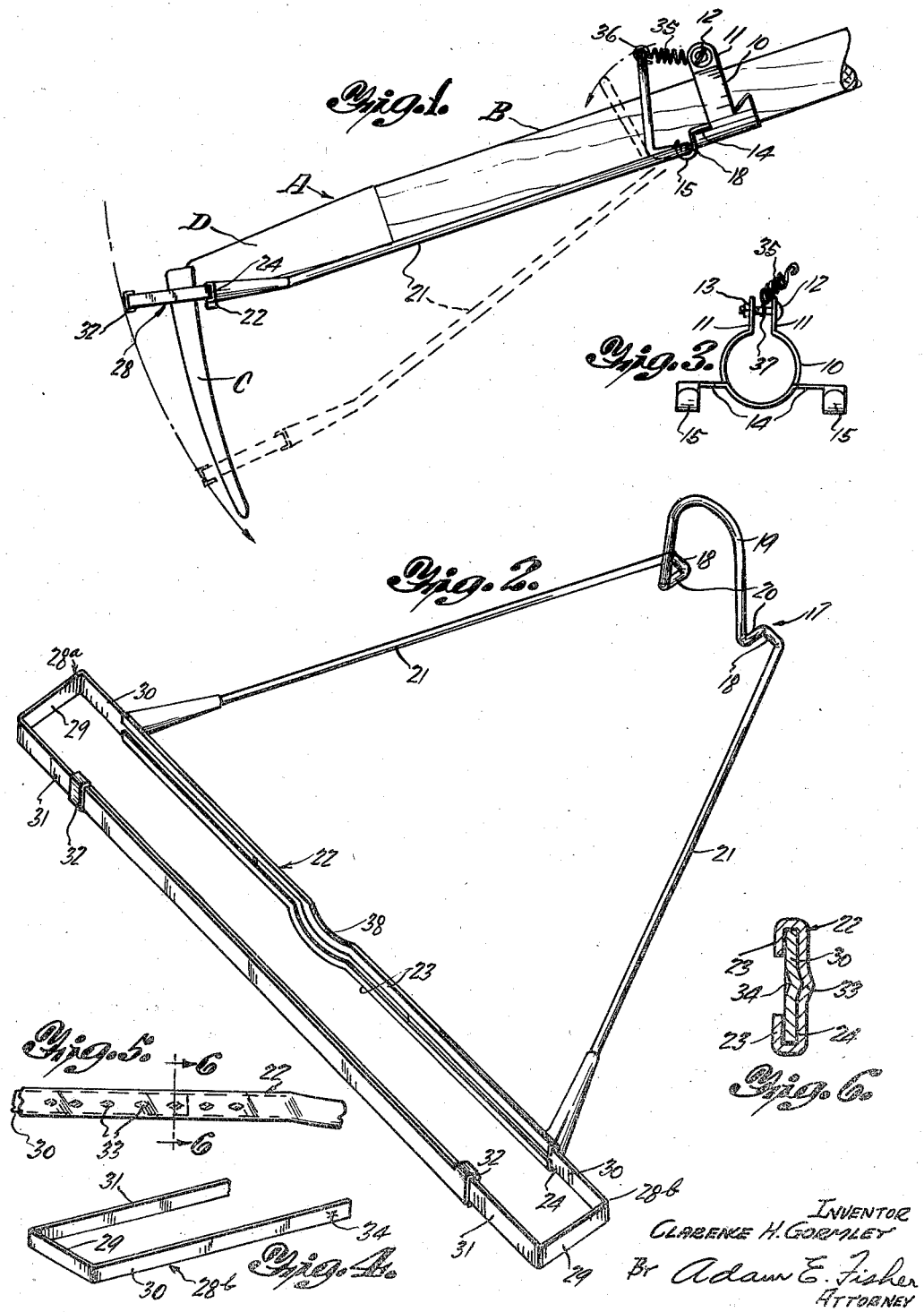
INVENTOR
CLARENCE H. GORMLEY
By Adam E. Fisher
ATTORNEY Patented Sept. 21, 1937

2,093,637

UNITED STATES PATENT OFFICE 2,093,637

RAKE CLEANING ATTACHMENT

Clarence H. Gormley, Farmington, Mo.

Application June 12, 1936, Serial No. 84,819

4 Claims. (Cl. 55—146)

My invention relates to improvements in rake cleaning attachments for lawn and garden rakes.

The main object of my invention is to provide a device which may be readily and conveniently operated to clean out all leaves, grass and similar debris which commonly become lodged between the teeth of a lawn or garden rake and which interfere greatly with the raking operation thereof.

Another object is to provide a rake cleaning device which may be readily attached to a garden or lawn rake without alteration or injurious change therein and which may be as readily detached when not in use.

Another object is to provide a rake cleaning device which is suitable for use on any commonly used form or style of rake and which is readily adjustable to fit rakes of any width and number of teeth.

A further object is to provide a rake cleaner which is simple and inexpensive in construction and comprises simply a parted mounting clamp for securing around the rake handle and having laterally extended bearing arms terminating in bearing hooks, a cleaner carrying frame including a bight adapted for pivotal and removable mounting in the said bearing hooks and having a U-shaped loop extended upwardly around the handle and detachably connected by a retractile coil spring to the clamp whereby the arms of the frame are normally held in one position, the said arms of the frame extending divergently from the clamp toward the rake head and being joined thereat by a channeled cross member, and slidably connected yoke members slidably and adjustably mounted in the cross member and enclosing the rake head.

With these and other objects in view the invention resides in the novel construction and arrangement of parts as hereinafter fully set forth and claimed, reference being had to the accompanying drawing as showing a preferred embodiment of my invention for purposes of exemplification.

In the drawing:

Figure 1 is a fragmental side elevation of a conventional form of rake showing my invention applied thereto.

Figure 2 is a perspective view of the cleaning yoke and its carrying frame.

Figure 3 is an end view of the clamp.

Figure 4 is a fragmental perspective view of one of the yoke members.

Figure 5 is a fragmental side elevation of the channeled cross members.

Figure 6 is an enlarged cross section along the line 6—6 in Figure 5.

Referring now with more particularity to the drawing the reference character A designates a well known form of rake comprising a handle B on the end of which the usual toothed rake head C is mounted by the ferrule D. As will become apparent however in the course of this description my cleaning attachment will fit not only this form of rake but any other well known forms such as the bow rake and the like.

In carrying out my invention I provide a mounting clamp 10 of annular parted form adapted to encircle the rake handle B and having radially extended apertured ears 11 through which a bolt 12 is placed and provided with a nut 13 for drawing the ears together and constricting the clamp around the handle. Integral arms 14 are extended laterally and oppositely from the clamp 10 as shown and at their outer end portions are turned downwardly and back upwardly from their lateral margins forming upwardly opening bearing hooks 15. When mounted in the rake A the clamp 10 is placed on the handle B some distance back of the rake head C with the ears 11 turned upwardly and the arms 14 extended laterally at right angles to the handle and parallel with the said head C. The arms 14 are disposed adjacent the underside of the clamp as shown.

A carrier or yoke frame made of heavy wire or rod is provided and same comprises a bight portion 17 having axially aligned bearing reaches 18 and a U-shaped loop 19 disposed eccentrically to and offset from the reaches 18 by short sections 20. The reaches 18 are adapted to pivotally and removably mount in the bearing hooks 15 and the loop 19 will then extend upwardly and around the handle B forwardly of the clamp 10 as shown. Arms 21 are extended forwardly and divergently from the bight 17 toward and adjacent to the rake head C and are joined at their free frontal ends by a cross bar or member 22 which extends in parallelism to and immediately behind the head C. This cross member 22 has marginal flanges or lips 23 turned inwardly and spaced so as to form a slideway or channel 24 as shown.

A cleaning yoke 28 is provided and same is made up of two substantially U-shaped sections 28a and 28b formed up from flat metal strips to provide for each a bight 29, relatively short inner leg 30 and longer outer leg 31. The inner leg 30 of the sections 28a and 28b are slidably inserted in opposite ends of the channel 24 in the cross member 22 and each of the longer legs 31 has ears 32 bent around the adjacent legs to form a slidable connection therewith. The two yoke sections 28a and 28b thus enclose the rake head C and each section may be pulled apart or pushed together to make the yoke fit a rake head of any usual width. The bight or main web of the cross member 22 has a series of spaced sockets or indentations 33 punched outward each side of its center and the ends of the legs 30 have tits or bosses 34 punched outward so that as the sections 28a and 28b are moved apart or together the said bosses will enter the sockets and so hold the yoke at any set length.

A retractile coil spring 35 is hooked at 36 to the loop 19 and is attached at 37 over the clamp bolt 12 and this spring is adapted by a rearward pull on the loop 19 to swing the arms 21 on their pivots in the hooks 15 and hold the yoke 28 elevated to the top of the rake head C as shown in full lines in Figure 1. The cross member 22 has a central drop or downward bend 38 to clear the ferrule D and allow the yoke 28 to rise to the top of the rake head as will be understood. Now when the teeth of the rake head become clogged with leaves, grass, etc., the rake may be raised and then swung downward sharply to an abrupt stop and the yoke 28 will snap or swing downwardly cleaning out the debris from the teeth. The spring 35 will then return the parts to normal position out of the way for use of the rake. The tension of the spring is such as to just hold the yoke raised and it will not retard the downward movement when the rake is manipulated as described to clean the teeth.

When its use is not desired the cleaner may be readily removed by lifting it from the hooks 15 and unhooking the spring 35, leaving the clamp 10 in place on the handle ready for replacement of the cleaner. Since no tools are required for this operation it may be carried out conveniently and quickly.

While I have herein set forth a certain preferred embodiment of my invention it is understood that I may vary from the same in minor structural details so as best to provide a practical device for the purposes intended, not departing from the spirit of the invention and within the scope of the appended claims.

I claim:

1. In combination with a rake including a handle and toothed head, a clamp secured around the rake handle at some distance from the rake head, arms extended laterally from the clamp, bearing hooks on the said arms, a frame including a bight pivotally mounted in the said hooks and a U-shaped loop offset from the bight and extended around the handle, a retractile coil spring hooked between the clamp and the loop, the said frame including arms extended from the bight toward the rake head, a yoke attached to the free ends of the arms and enclosing the said rake head, a cross member joining the free ends of the arms and having a longitudinal channel, and the said yoke comprising a pair of U-shaped sections each with one leg slidably connected to one leg of the other and the remaining legs slidably mounted in the said channels.

2. In combination with a rake including a handle and toothed head, a clamp secured around the rake handle at some distance from the rake head, arms extended laterally from the clamp, bearing hooks on the said arms, a frame including a bight pivotally mounted in the said hooks and a U-shaped loop offset from the bight and extended around the handle, a retractile coil spring hooked between the clamp and the loop, the said frame including arms extended from the bight toward the rake head, a yoke attached to the free ends of the arms and enclosing the said rake head, a cross member joining the free ends of the arms and having a longitudinal channel, the said yoke comprising a pair of U-shaped sections each with one leg slidably connected to one leg of the other and the remaining legs slidably mounted in the said channels, and means for locking the yoke sections in any adjusted position in the channel.

3. In combination with a rake having a handle and toothed head, a clamp secured to the rake handle, a carrier frame pivoted and removably mounted on the clamp at the underside of the rake and including arms extended forwardly and divergently from the clamp, a yoke secured to the frontal ends of the arms and enclosing the rake head, a U-shaped loop joining the said carrier arms, and arched loosely over the rake handle forwardly of the clamp, and a retractile coil spring stretched between the upper portions of the loop and clamp whereby the frontal ends of the said arms are normally elevated to hold the yoke at the top of the rake head.

4. In combination with a rake including a handle and toothed head, a clamp secured to the rake handle, a carrier pivotally mounted on the clamp and including forwardly extended diverging arms, the said carrier being spring set to normally swing the said arms upwardly, a cross member joining the free frontal ends of the said arms and having a longitudinal channel, and a yoke enclosing the rake head and comprising a pair of U-shaped sections each with one leg slidably connected to one leg of the other and the remaining legs slidably mounted endwise into the said cross member.

CLARENCE H. GORMLEY.